United States Patent Office 3,493,631
Patented Feb. 3, 1970

---

3,493,631
EPOXIDIZED POLYESTERS PREPARED FROM HYDROGENATED BISPHENOLS AND TETRAHYDROPHTHALIC ACID IN EQUIMOLAR AMOUNTS
Roger M. Christenson and Rostyslaw Dowbenko, Gibsonia, Pa., assignors to PPG Industries, Inc., Pittsburgh, Pa., a corporation of Pennsylvania
No Drawing. Filed Nov. 16, 1967, Ser. No. 683,479
Int. Cl. C08g 30/00, 37/34, 43/06
U.S. Cl. 260—834                                13 Claims

---

ABSTRACT OF THE DISCLOSURE

A hydrogenated bisphenol is reacted with tetrahydrophthalic acid to form a polyester. The polyester is epoxidized and used as an adhesion-promoting additive for thermosetting coating compositions. The preferred embodiment is an epoxidized polyester formed from hydrogenated Bisphenol A and tetrahydrophthalic acid. The epoxidized polyester may be combined with thermosetting resins as exemplified by unsaturated polyesters, alkyd resins, aminoplast resins, phenolic resins, conjugated diene resins, polyurethanes, furan resins, thermosetting silicone resins, coumarone-indene resins, and thermosetting acrylic resins.

---

In United States Patent No. 2,870,117 it is disclosed that certain thermosetting resin coating compositions attain improved adhesive qualities when an epoxy resin which is a polyglycidyl ether of a phenolic compound is added thereto. The resulting compositions were found to be adherent to many substrates and are useful in coating compositions, giving very tough and mar resistant films which possess excellent chemical resistance.

Although these thermosetting coating compositions have excellent properties, including strong adhesion to a large variety of base materials, the use of epoxy resins of the class contemplated heretofore tends to reduce the exterior durability of the resulting coatings. Hence, the coating industry has been seeking a suitable material which has very little degradation on exposure to atmospheric conditions and still retains the good adhesion-promoting characteristics of the epoxy resins.

It has now been discovered that outstanding coating compositions can be obtained by blending thermosetting resin coating compositions with an epoxidized polyester formed by epoxidizing a polyester prepared by the reaction of tetrahydrophthalic acid or its anhydride and a hydrogenated bisphenol. The resulting coating composition forms films which are outstanding in appearance, gloss, mar resistance, color retention, moisture resistance, stain resistance, grease resistance, heat resistance, detergent resistance, corrosion resistance, adhesion and flexibility, and have no undesirable odor. This epoxidized polyester surprisingly is stable to degradation and yet retains the gross structural similarity to the prior art epoxy resins so that the adhesion-promoting characteristics are retained. The gloss retention of the thermosetting resin coating compositions containing these new epoxidized polyester resins is substantially improved.

The polyesters of this invention are formed by reacting tetrahydrophthalic acid or its anhydride with a hydrogenated bisphenol at an elevated temperature.

It is to be understood that the term "tetrahydrophthalic acid" used throughout the specification and claims is meant to include both the acid and the anhydride. Actually, it is preferred to use the tetrahydrophthalic anhydride as esterification proceeds easily with the anhydride, and the anhydride is readily available commercially.

Any hydrogenated bisphenol,

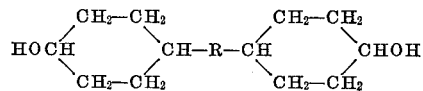

where R is an alkylene group, such as propylene, ethylene, isobutylene, etc., may be used. Some examples are 2,2 - bis(4 - hydroxycyclohexyl)propane (hydrogenated Bisphenol A), 1,1 - bis(4 - dihydroxycyclohexyl)ethane, 1,1 - bis(4 - hydroxycyclohexyl) - 2 - methylpropane, 2,2 - bis(4 - hydroxycyclohexyl)butane, and 2,2 - bis(4-hydroxytertiarybutylcyclohexyl)propane. The hydrogenated Bisphenol A is the preferred bisphenol as this is the most commercially available hydrogenated bisphenol.

It is to be understood that the term "hydrogenated bisphenol," as used throughout the specification and claims, refers to bisphenols that are especially completely hydrogenated, as are the above exemplified hydrogenated bisphenols, and refers oinly to the products. (That is, the compounds may be formed in any manner.)

The reaction is carried out at an elevated temperature of from 150° C. to 300° C. No diluents or carriers of water are necessary, although it is preferable to blow a steady stream of inert gas through ahe reaction mixture to aid in the removal of water.

The molar ratio of tetrahydrophthalic acid to hydrogenated bisphenol can be varied, but it generally approximates 1 mole of acid to 1 mole of hydrogenated bisphenol. If an excess of either reactant is present in the reaction mixture, the mixture may be neutralized by reaction with a monohydric alcohol or a monobasic acid.

The final product will generally have an acid value of greater than about 20.

These polyesters are then epoxidized by treating them with a peracid solution in a solvent. Other methods of epoxidizing polyesters are described in United States Patents Nos. 2,458,484; 2,485,160; 2,567,930 and 2,569,-502.

The acid solution may be any acid, but generally peracetic acid, performic acid, perphthalic acid or perbenzoic acid are used.

Examples of suitable solvents that may be utilized are ethyl acetate, benzene, toluene, dioxane, tetrahydrofuran and ethylene glycol dimethyl ether.

The epoxidation can take place at room temperature and is generally carried out for from 3 to 30 hours. The ratio of polyester to acid may be varied considerably. Generally, equal molar amounts of both reactants are used.

The resulting epoxidized polyester has an OH value of from 1 to 200, and an epoxide equivalence of greater than 500.

The preferred embodiment of this invention, the epoxidized polyester is blended with a thermosetting resin to promote the adhesion of said thermosetting resin to various substrates, such as metal, wood, glass, etc.

Any thermosetting resin can be blended with the epoxidized polyester to form the adherent coating compositions of this invention. Examples of some of the thermosetting resins that may be used are given below.

UNSATURATED POLYESTER COMPOSITIONS

Unsaturated polyester resins are well known in the art as a thermosetting resinous material. The unsaturated polyester usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid, and the like. Some of the dicarboxylic acid or acid anhydride may be free of ethylenic unsaturation, e.g., phthalic acid, isophthalic acid, terephthalic acid, adipic acid, succinic acid, phthalic anhydride, and the like. The unsaturated polyester is ordinarily dissolved in a polymerizable monomer, such as styrene, vinyl toluene, acrylates, methacrylates, etc. A typical composition of this type contains from about 20 to 50 parts by weight of styrene and 80 to 50 parts by weight of the unsaturated polyester. Such compositions thermoset when heated in the presence of a suitable polymerization catalyst, such as benzoyl peroxide.

ALKYD RESINS

Any of the various alkyd resins used in coatings can be utilized, including resins produced from essentially any polybasic acid and polyfunctional alcohol. For example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be non-oil-moidified or modified with a non-drying, semi-drying or drying oil. Coconut oil, tung oil, linseed oil and soybean oil are among those often employed. The alkyd resin can also contain a monobasic acid, such a benzoic acid, or it can be a polyester-containing adipic acid or a similar acid along with various glycols and/or polyols. An example of a useful alkyd is linseed oil-modified glycol adipate.

The alkyd resin may also be copolymerized with one or more other polymerizable ethylenically unsaturated monomers, such as styrene, acrylic or methacrylic esters, and the like. The most typical of these are styrenated alkyds.

It is noted that alkyd resins are thermoset by the addition of crosslinking agents such as aminoplasts and phenolic resins.

AMINOPLAST RESINS

Aminoplast resins are produced from the condensation products of amines or amides with an aldehyde. The most common aminoplast resins are urea-formaldehyde and melamineformaldehyde resins However, condensation products of other amines and amides can also be employed, for example, those of triazines, diazines, triazoles, guanidines, guanamines, and alkyl and aryl-substituted derivatives of such compounds, including alkyl and aryl substituted ureas, and alkyl and aryl-substituted melamines, provided at least one amino groups is present. Some examples of such compounds are N,N'-dimethylurea, benzoguanamine, 6-methyl-2,4-diamino-1,3,5-triazine, 3,5-diaminotriazole, triaminopyrimidine, 2,4,6-triphenyl-triamino-1,3,5-triazine, and the like. The aldehyde is most often formaldehyde, although similar condensation products can be made from other aldehydes, such as acetaldehyde. In many cases, all or part of the alkylol groups of the condensation product are etherified by reaction with an alcohol to provide organic solvent-soluble materials. Any monohydric alcohol can be employed for this purpose, the preferred alcohols being methanol and butanol. Blends or mixtures of aminoplasts and alkyds are also good thermosetting resins.

PHENOLIC RESINS

Phenolic resins are formed by the condensation of an aldehyde and a phenol. The most used aldehyde is formaldehyde, although other aldehydes such as acetaldehyde can also be employed. Methylene-releasing and aldehyde-releasing agents, such as paraformaldehyde and hexamethylenetetramine, can be utilized as the aldehyde agent if desired. Various phenols can be used; for instance, the phenol employed can be phenol, per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol, and unsaturated hydrocarbon-substituted phenols, such as the monobutenyl phenols containing a butenyl group in ortho, meta or para position, and where the double bond occurs in various positions in the hydrocarbon chain. A common phenolic resin is phenol-formaldehyde.

CONJUGATED DIENE POLYMERS

Conjugated diene polymerizates, such as homopolymerized 1,3-butadiene, 2-chlorobutadiene or isoprene, and linear copolymers or terpolymers, such as butadiene-acrylonitrile copolymer, isobutylene-butadiene copolymer, butadiene-styrene copolymer, and 2 - chlorobutadiene-vinylidene cyanide-acrylonitrile terpolymers also form thermosetting coating compositions useful in the invention.

DRYING OR SEMI-DRYING OILS

Various highly unsaturated oils, such as linseed oil and tung oil, are film-forming by an oxidative mechanism and can be employed herein. Oils having iodine numbers of at least about 100 are of this type. Bodied, blown and otherwise partially polymerized oils can also be used.

POLYURETHANES

The polyurethanes comprise another class of thermosetting resins that form coatings which have improved durability when blended with the epoxidized polyesters of this invention. Essentially, the polyurethanes are condensation products of a diisocyanate and a compound having at least two reactive hydrogen atoms, i.e., hydrogen atoms determinable by the Zerewitinoff method. The useful active hydrogen-containing compounds may be polyesters prepared from polycarboxylic acids and polyhydric alcohols, polyhydric polyalkylene ethers having at least two hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic polyacrylic, naphthalene-1,2-dicarboxylic, fumaric, itaconic, etc., acids, with polyalcohols, such as ethylene glycol, diethylene glycol, pentaglycol, glycerol, sorbitol, triethanolamine, di-(beta-hydroxyethyl)ether, etc., and/or amino-alcohols, such as ethanolamine, 3-aminopropanol, 5-amino-pentanol-1, 10-aminodecanol, 6-amino-5-methylhexanol-1, p-hydroxymethylbenzylamine, etc., and with mixtures of the above polyalcohols and amines, ethylenediamine, 3-methylhexamethylenediamine, decamethylenediamine and m-phenylenediamine, etc., and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methylpentanediol-2,4, 2-ethylhexanediol-1,3, hexamethylene glycol, styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyeasteramides, alkylene glycols, polyisocyanate-modified alkylene glycols, polyoxyalkylene glycols, polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene - 1,2 - diisocyanate, cyclohexylene-1,2-diisocyanate, m-phenylene diisocyanate, 2,4-tolylene diisocyanate, 3,3' - dimethoxy-4,4'-biphenylene diisocyanate, 3,3'-dichloro-4,4'-biphenylene diisocyanate, triphenylmethane triisocyanate, 1,5 - naphthalene diisocyanate or polyisocyanates in a blocked or inactive form, such as the bisphenyl carbamates of tolylene diisocyanate and 1,5-naphthalene diisocyanate, etc.

FURAN RESINS

Furan resins comprise resinous products obtained from furfural and its derivatives, including furan, tetrahydrofurfuryl alcohol and furfuryl alcohol. Furfural reacts with phenols to form phenoplasts. Furfuryl alcohol also forms ether linkages readily with other active hydroxyl groups to give useful thermosetting resins. The furfuryl alcohol can also be reacted with formaldehyde, ketones and methyl acetone to form thermosetting coating compositions.

THERMOSETTING ACRYLICS

There are three types of thermosetting acrylics that are becoming increasingly important. One class is interpolymers of an unsaturated carboxylic acid amide with at least one other monomer having a $CH_2=C<$ group, said interpolymer being characterized by having amido hydrogen atoms replaced by the structure $—RCHOR_1$, wherein R is selected from the group consisting of hydrogen and saturated lower aliphatic hydrocarbon radicals, and $R_1$ is a member of the class consisting of hydrogen and a radical derived by removing the hydroxyl group from a monohydric alcohol, such as those disclosed in United States Patents Nos. 2,870,117; 2,978,437; 3,037,965 and 3,079,434. Another class is interpolymers of a hydroxyalkyl ester of an ethylenically unsaturated carboxylic acid and at least one other ethylenically unsaturated monomer copolymerizable therewith, such as are described in United States Patents Nos. 2,681,897 and 3,084,184. A third class comprises cross-linking carboxyl resins.

The blend of the epoxidized polyester of this invention and the interpolymer of an unsaturated carboxylic acid amide is the preferred embodiment of this invention. In this embodiment, acrylamide or some other polymerizable amide is polymerized with one or more ethylenically unsaturated monomeric compounds, and the resulting interpolymer reacted with an aldehyde to form one component of the coating compositions of this invention.

Among the monomers which may be polymerized with acrylamide are included methyl acrylate, ethyl acrylate, isobutyl acrylate, hexyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, hydroxy-substituted acrylics such as hydroxymethyl methacrylate, hydroxyethyl acrylate, and the like. In general, it is preferred that the monomer utilized contain a single $CH^2=C<$ group in terminal position, and an especially preferred group of monomers includes ethyl acrylate, butyl acrylate, methyl acrylate, styrene, vinyl toluene, acrylic acid, and monomethyl styrene.

It has been found that preferred unsaturated carboxylic acid amide interpolymers are obtained when at least two monomeric compounds are interpolymerized with acrylamide. In this manner, it is possible to tailor the interpolymer to have any desired degree of hardness or flexibility. For example, one useful ternary interpolymer is prepared from acrylamide, ethyl acrylate and styrene. Also, a small amount of methyl methacrylate tends to improve the hardness of two-component interpolymers where one of the monomers is of the type which forms soft homopolymers, and a small quantity of an acid monomer, such as acrylic acid, methacrylic acid, crotonic acid, maleic acid or fumaric acid, has been found to be particularly useful as an internal catalyst in that it imparts to the coating composition desirable fast curing properties. In place of acrylamide, any other polymerizable amide, for example, methacrylamide or itaconic diamide, may be utilized.

In another preferred embodiment of this invention, the epoxidized polyester is blended with the second important class of thermosetting acrylic resins comprising the cross-linked hydroxyalkyl ester of an ethylenically unsaturated carboxylic acid. Any crosslinking agent may be used, such as aminoplast resins, etc. As seen in U.S. Patent 2,681,897, these compositions generally comprise a compatible mixture of 5–40% by weight of a thermosetting alcohol-modified, aminoplast resin and 95–60% by weight of a thermoplastic copolymer of (1) an hydroxy alkyl ester of an alpha beta ethylenically unsaturated carboxylic acid and (2) a compound containing a $CH_2=C<$ group, wherein the ratio of (1):(2) on a mol percent basis is 5:95–50:50, respectively, wherein the hydroxyl group of (1) is a part of a $—CH_2OH$ group and compound (2) is devoid of any hydroxy group wherein said aminoplast resin is the condensation product of an aldehyde and a compound selected from the group consisting of urea, melamine, dicyandiamide, formoquanamine, benzoguanamine, ammeline, 2-chloro-4,6-diamino-1,3,5-triazine, 2-phenyl-p-oxy-4,6-diamino-1,3,5-triazine, 6-methyl - 2,4 - diamino - 1,3,5 - triazine, 2,4,6 - trihydrazine - 1,3,5 - triazine, 2,4,6 - triethyl - triamino - 1,3,5 - triazine, and 2,4,6-triphenyl triamino-1,3,5-triazine.

Preferred polymerizations of the class described are those containing hydroxyalkyl esters in which the alkyl group has up to about 12 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl)maleate, bis(hydroxypropyl)fumarate, and similar bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, butadiene-1,3, 2-chlorobutene, alpha-methyl styrene, alpha - chlorostyrene, 2 - chlorobutadiene-1,3 1,1 - dichloroethylene, vinyl butyrate, vinyl acetate, allyl chloride, dimethyl maleate, and the like.

The third important class of thermosetting acrylics that may be blended with the epoxidized polyester comprises the crosslinked carboxyl-containing polymers. The thermosetting carboxyl resins that may be used here consist generally of acrylic resins or modified acrylic resins containing from 5 to 40 percent ethylenically unsaturated acid which is crosslinked with a compound containing functional groups such as epoxides, polyols, amines and melamines. It is noted that the carboxyls may be cured by the blending of the uncured carboxyl resins with the epoxidized polyesters of this invention.

Acrylic resins that may be used are acrylates, such as ethyl acrylate, butyl acrylate, hexyl acrylate; methacrylates, such as methyl methacrylate, isopropyl methacrylate, hexyl methacrylate; maleate esters such as dibutyl maleate; fumarates, such as ethyl fumarate, and others.

The ethylenically unsaturated acids which may be used are those such as acrylic acid, methacrylic acid, fumaric acid, maleic acid, itaconic acid, and others.

The carboxyls are crosslinked by the addition of compounds containing functional groups such as polyols, amines, melamines and epoxy resins.

Thermosetting silicones and cumarone-indene resins are but two of the many other thermosetting resins that may be used here.

It is to be noted that the above examples are by no means inclusive of all the thermosetting resins that may be used in this invention. Any thermosetting coating composition capable of forming a film coating on a substrate may be blended with the epoxidized polyester of this invention to improve the adherence of that film to the base without deleteriously affecting the durability of the coating.

Thee quantity of the epoxidized polyester which is blended with the thermosetting resin to form the resinous portion of the coating composition of this invention may be varied considerably. For example, amounts as low as about 2 percent by weight give enhanced properties to the coating compositions and amounts as high as 50 percent of the epoxidized polyester may be employed. Preferably, the new epoxidized polyester is utilized in an amount of about 5 percent to about 10 percent.

No special expedients are necessary in formulating the blended resins of this invention. For example, they may be prepared simply by admixing a solution of the thermosetting resin with a solution of the epoxidized polyester. No heating is required as the components may be blended readily in the cold state. The solvents used are likewise not critical and any solvent or solvents which will dissolve the thermosetting resin and the epoxidized polyester may be employed. Typical solvents that are used are xylol, butanol and methyl isobutyl ketone. Useful compositions within the scope of the invention can also be obtained by heating or otherwise reacting the epoxidized polyester and the thermosetting resin together and dissolving the resulting product in a suitable solvent system. The epoxidized polyester may also be added at the same time the thermosetting resin is being prepared.

Pigments such as titanium dioxide, carbon black and the like may be added to the coating composition to form any desired color. Other ingredients normally found in coating compositions, such as germicides, fillers, driers, silicones and the like, may also be added.

When an internal catalyst, such as acrylic acid, methacrylic acid or the like, is present in the thermosetting resin, no additional catalyst may be needed to promote the cure of the films obtained from coating compositions disclosed herein. However, in the event the thermosetting resin does not contain an internal catalyst, it is often desirable to add an acidic material shortly before the composition is to be used. Suitable catalysts for this purpose include citric acid, tartaric acid, phosphoric acid, as well as latent catalysts, that is, materials which function as do the acidic materials when heated. Suitable cures may also be obtained in the absence of any catalyst, although slightly higher temperatures and/or baking times may be necessary when the catalyst is not present.

The blends of the thermosetting resin compositions and the epoxidized polyesters are used most extensively for protective coatings. These coatings can be used to protect any base, for example, metal, wood, glass, etc. A particularly difficult adhesion problem is encountered in coating a metal base with many thermosetting resins. The blending of these resins with the epoxidized polyester resins promotes the adherence of the thermosetting resin to the metal base without appreciably affecting the durability of the coating composition.

The present invention is more particularly described in the following examples, which are intended as illustrative only since numerous modifications and variations therein will be apparent to those skilled in the art. It is to be understood that unless otherwise indicated, all percentages are by weight and are based upon nonvolatile solids content.

EXAMPLE 1

This example illustrates the preparation of an epoxidized polyester of tetrahydrophthalic acid and hydrogenated Bisphenol A for use as adhesion promoters in thermosetting resin coating compositions.

A reaction vessel was charged with 2.0 moles of tetrahydrophthalic acid and 2.15 moles of hydrogenated Bisphenol A, and heated to 245° C. A steady stream of nitrogen gas was blown through the reaction mixture to aid in the removal of water. The resulting polyester had an acid value of 45.8.

Nine hundred fifty-two (952) parts of the polyester prepared above was added to 952 parts of ethyl acetate in a separate vessel, and the mixture was stirred. Forty (40) parts of anhydrous sodium acetate was added and then 760 parts of a 40 percent solution of peracetic acid in acetic acid was added dropwise over a period of 4.5 hours. The temperature was maintained below 30° C. by frequent cooling with ice water, and when the exothermic reaction was complete, the mixture was stirred at room temperature for 25 hours. The mixture was then washed and the ethyl acetate was removed.

The final product was 45.3 percent solids at a viscosity of A, an OH value of 20.3, and an epoxide equivalence of 1454.

EXAMPLE 2

A reaction vessel was charged with 9.0 moles of tetrahydrophthalic acid and 9.9 moles of hydrogenated Bisphenol A, and heated to 244° C. A steady stream of nitrogen gas was blown through the reaction mixture to aid in the removal of water. The resulting polyester had 53.0 percent solids, a viscosity of C to D, and an acid values of 34.2.

Nine hundred fifty-two (952) parts of the polyester prepared above was added to 952 parts or ethyl acetate in a separate reaction vessel, and the mixture was stirred. Forty (40) parts of anhydrous sodium acetate was added and then 760 parts of a 40 percent solution of peracetic acid in acetic acid was added dropwise over a period of 4.5 hours. The temperature was maintained below 30° C. by frequent cooling with ice water, and when the exothermic reaction was complete, it was stirred at room temperature for 25 hours. The mixture was then washed and the ethyl acetate was removed. The final product had a solids content of 50.7 percent, a viscosity of A, and an OH value of 2.2.

EXAMPLES 3–7

Blends of epoxidized polyesters of tetrahydrophthalic acid and hydrogenated Bisphenol A with interpolymers of an acrylamide with at least one other monomer having a $CH_2=C<$ group, said interpolymer being characterized by having amido hydrogen atoms replaced by the structure —$RCHOR_1$, wherein R is selected from the group consisting of hydrogen and saturated lower aliphatic hydrocarbon radicals, and $R_1$ is a member of the class consisting of hydrogen and lower alkyl radicals, were prepared by merely mixing the resins together at room temperature. These blends were coated onto a metal substrate and tested for adhesion and gloss retention. Comparisons were made between the coatings of Examples 3 to 7 and the control coatings without an epoxy resin adhesion-promoter and control coatings with conventional epoxy resins as adhesion-promoting additives. The results are tabulated in the table below:

1 part of a solution containing 15 percent diethylaminopropylamine and 85 percent xylene and applied to an aluminum panel and baked at 350° F. for 30 minutes. The crosshatch adhesion test showed a vast improvement in adhesion over that of a film of the untreated carboxyl polymer on an aluminum base that had been baked at 350° F. for 30 minutes.

TABLE

| | Source of Epoxy Resin Used in the Blend [1] | Percent Epoxy Resin in Thermosetting Coating Resin | Thermosetting Resin Used in Blend | Adhesion [4] | 80 Inch-lbs. Impact Test [5] | 40 Inch-lbs. Impact Test [6] | Percent Gloss Retention After 12 Months in Florida [7] |
|---|---|---|---|---|---|---|---|
| Control A | None | 0 | A [2] | 10 | 10 | 7 | 70 |
| Control B | Epon 1001 [8] | 5 | A | 7 | 2 | 5 | 51 |
| Example 3 | 1 | 5 | A | 1 | 4 | 1 | 63 |
| Example 4 | 2 | 5 | A | 3 | 10 | 8 | 63 |
| Control C | Epon 1001 | 10 | A | 10 | 0 | 5 | 12 |
| Control D | Epon 828 [9] | 10 | A | 5 | 5 | 3 | 46 |
| Example 5 | 1 | 10 | A | 1 | 8 | 6 | 58 |
| Control E | None | 0 | B [3] | 9 | | | |
| Control F | Epon 1001 | 10 | B | 2 | | | |
| Control G | Epon 828 | 10 | B | 1 | | | |
| Example 6 | 1 | 10 | B | 3 | | | |
| Example 7 | 2 | 10 | B | 1 | | | |

The following is an explanation of the superscripts in the Table:
[1] The numbers describe the source of the epoxy resin used to modify the thermosetting resins and correspond to the epoxy resins prepared in the examples of the corresponding numbers.
[2] A thermosetting resin interpolymer having a composition of 10 percent acrylamide, which has been reacted with formaldehyde and butanol, 2.5 percent methacrylic acid, 43.5 percent styrene and 44 percent ethyl acrylate.
[3] A thermosetting resin interpolymer having a composition of 10 percent acrylamide which has been reacted with formaldehyde and butanol, 42.5 percent butyl acrylate, 25.0 percent styrene, 20.0 percent acrylonitrile and 2.5 percent methacrylic acid.
[4] Adhesion was determined by the crosshatch adhesion test. The coatings on metal bases were crosshatched and taped, and the tape was subsequently removed and the surface of the tested material inspected. The values are given on a basis of 0 to 10, with 10 indicating complete failure of the coating and 0 indicating perfect adhesion or no effect on the coating by the test.
[5] The adhesion was tested by a Gardner impact test using a force of 80 inch-pounds. The tested material was inspected and assigned scores of 0 to 10, with 10 indicating complete failure of the coating and 0 indicating no defect on the coating due to the test.
[6] The adhesion was tested by a Gardner impact test using a force of 40 inch-pounds. The tested material was inspected and assigned scores of 0 to 10, with 10 indicating complete failure of the coating and 0 indicating no defect on the coating due to the test.
[7] Gloss retention was tested on coated aluminum panels by exposing the panels to weathering conditions for one year in Florida. After one year of horizontal exposure, the weathering properties were tested as to the percent gloss retained by the coating.
[8] A conventional resin condensation product of Bisphenol A and epichlorohydrin sold by Shell Chemical Company with a melting point range of 64° C. to 76° C., hydroxy equivalent of 130, and epoxide equivalence of 450 to 525.
[9] A conventional epoxy resin condensation product of Bisphenol A and epichlorohydrin sold by Shell Chemical Company with an epoxide equivalence of 155 to 195.

As seen by the results obtained, the inclusion of the epoxidized polyesters of this invention in the thermosetting resin coating composition significantly increases the adhesion properties of the coating, and the inclusion of the epoxidized polyester shows considerable improvement in weathering properties over the inclusion of the conventional epoxy resin as shown by the increase in gloss retention.

EXAMPLE 8

A thermosetting resin composition consisting of 30 percent styrene, 30 percent 2-ethylhexyl acrylate, 18 percent methyl methacrylate, 12 percent butyl methacrylate, 4 percent hydroxyethyl methacrylate, 4 percent hydroxypropyl methacrylate and 2 percent methacrylic acid was crosslinked with 25 percent of butylated melamine-formaldehyde resin and coated on a steel panel and baked at 250° F. for 30 minutes. The crosshatch adhesion test on this coating was compared to that of a coating of the same composition crosslinked with 25 percent butylated melamine-formaldehyde resin and blended with 5 percent by weight of the epoxidized polyester prepared in Example 1. The tests showed considerable improvement of the adhesion of the resin blended with the epoxidized polyester over the adhesion of the resin coating without the epoxidized polyester.

EXAMPLE 9

A thermosetting carboxyl polymer consisting of 59 percent ethyl acrylate, 30 percent styrene and 11 percent methacrylic acid which has a solids content of 48.9 percent in a solution of 75 percent xylene and 25 percent butyl Cellosolve was mixed together with the epoxidized polyester of this invention and tested for adhesion to a metal panel.

Eighty (80) parts of the carboxyl polymer were added to 20 parts of the epoxidized polyester of Example 1 and

EXAMPLE 10

A thermosetting resin composition consisting of an alkyd resin comprising 38.7 percent phthalic anhydride, 39 percent tirmethylolethane ester of coconut fatty acid, and 23.3 percent trimethylolethane was crosslinked with 25 percent butylated melamine-formaldehyde resin and coated on a steel panel and baked at 250° F. for 30 minutes. A crosshatch adhesion test of this coating was compared to the crosshatch adhesion test of a coating of the same film blended with 5 percent of the epoxidized polyester resin prepared in Example 2 and heated at 250° F. for 30 minutes. The adhesion of the latter coating was found to be vastly superior to the adhesion of the coating that was not modified with the epoxidized polyester.

While there are above described a number of specific embodiments of the present invention, it is obviously possible to produce other embodiments and various equivalent modifications thereof without departing from the spirit of the invention or the scope of the appended claims.

We claim:
1. An epoxidized polyester of (1) tetrahydrophthalic acid and (2) a hydrogenated bisphenol said epoxidized polyester having been prepared by peroxidation of the unsaturation in said polyester, said (1) and said (2) being reacted in about equimolar proportions.

2. The expoxidized polyester of claim 1 wherein the hydrogenated bisphenol is hydrogenated Bisphenol A.

3. The epoxidized polyester of claim 1 formed by treating a polyester of (1) tetrahydrophthalic acid and (2) hydrogenated Bisphenol A with peracetic acid.

4. A heat-hardenable resinous composition comprising (1) the epoxidized polyester of claim 1 and (2) a thermosetting coating composition selected from the group consisting of unsaturated polyester compositions, alkyl resins, aminoplast resins, phenolic resins, conjugated diene polymers, polyurethanes, furan resins, thermosetting silicones, cumarone-indene resins, and thermosetting acrylics selected from the class consisting of (a) an interpolymer of an unsaturated carboxylic acid amide with at least one other monomer having a $CH_2=C<$ group, said interpolymer being characterized by having amide groups with amido hydrogen atoms replaced by the structure $—RCHOR_1$, wherein R is selected from the group consisting of hydrogen and saturated lower aliphatic hydrocarbon radicals, and $R_1$ is a member of the class consisting of hydrogen and a radical derived by removing the hydroxyl group from a monohydric alcohol, (b) a composition of matter comprising a compatible mixture of 5–40% by weight of a thermosetting alcohol-modified, aminoplast resin and a 95–60% by weight of a thermoplastic copolymer of (1) an hydroxy alkyl ester of an alpha beta ethylenically unsaturated carboxylic acid and (2) a compound containing a $CH_2=C<$ group, wherein the ratio of (1):(2) on a mol percent basis is 5:95–50:50, respectively, wherein the hydroxy group of (1) is a part of a $—CH_2OH$ group and compound (2) is devoid of any hydroxy group wherein said aminoplast resin is the condensation product of an aldehyde and a compound selected from the group consisting of urea, melamine, dicyandiamide, formoguanamine, benzoguanamine, ammeline, 2-chloro-4,6 - diamino - 1,3,5 - triazine, 2 - phenyl - p - oxy - 4,6-diamino - 1,3,5 - triazine, 6 - methyl - 2,4 - diamino-1,3,5 - triazine, 2,4,6 - trihydrazine - 1,3,5 - triazine, 2,4,6 - triethyl - triamino - 1,3,5 - triazine, and 2,4,6-triphenyl triamino-1,3,5-triazine, and (c) thermosetting carboxyl resins consisting essentially of acrylic resins containing from 5 to 40 percent ethylenically unsaturated acid which is crosslinked with a compound containing functional groups; wherein the composition comprises from about 2 percent to about 50 percent by weight of the epoxidized polyester.

5. The heat-hardenable resinous composition of claim 4 wherein the composition comprises from 5 percent to 10 percent by weight of the epoxidized polyester.

6. The heat-hardenable resinous composition of claim 4 wherein the thermosetting coating composition comprises an interpolymer of an unsaturated carboxylic acid amide with at least one other monomer having a $CH_2=C<$ group, said interpolymer being characterized by having amide groups with amido hydrogen atoms replaced by the structure $—RCHOR_1$, wherein R is selected from the group consisting of hydrogen and saturated lower aliphatic hydrocarbon radicals, and $R_1$ is a member of the class consisting of hydrogen and a radical derived by removing the hydroxyl group from a monohydric alcohol.

7. The resinous composition of claim 6 wherein the interpolymer is a copolymer of styrene and acrylamide which has been reacted with formaldehyde and butanol.

8. The resinous composition of claim 6 wherein the thermosetting coating composition is an interpolymer of styrene, ethyl acrylate, acrylamide which has been reacted with formaldehyde and butanol, and an unsaturated carboxylic acid.

9. The resinous composition of claim 4 wherein the thermosetting coating composition is a cross-linked carboxyl polymer consisting essentially of acrylic resins containing from 5 to 40 percent ethylenically unsaturated acid which is crosslinked with a compound containing functional groups.

10. The resinous composition of claim 4 wherein the thermosetting coating composition comprises a cross-linked alkyd resin.

11. An article having a metallic surface having as a coating thereon a heat-hardenable film of the resinous composition of claim 4.

12. An article having a metallic surface having as a coating thereon a heat-hardenable film of the resinous composition of claim 6.

13. The resinous composition of claim 4 wherein the thermosetting coating composition is a composition of matter comprising a compatible mixture of 5–40% by weight of a thermosetting alcohol-modified aminoplast resin and 95–60% by weight of a thermoplastic copolymer of (1) an hydroxy alkyl ester of an alpha beta ethylenically unsaturated carboxylic acid and (2) a compound containing a $CH_2=C<$ group, wherein the ratio of (1):(2) on a mol percent basis is 5:95–50:50, respectively, wherein the hydroxy group of (1) is a part of a $—CH_2OH$ group and compound (2) is devoid of any hydroxy group wherein said aminoplast resin is the condensation product of an aldehyde and a compound selected from the group consisting of urea, melamine, dicyandiamide, formoquanamine, benzoguanamine, ammeline, 2-chloro - 4,6 - diamino - 1,3,5-triazine, 2-phenyl-p-oxy - 4,6 - diamino - 1,3,5 - triazine, 2-phenyl-p-oxy-4,6 - diamino - 1,3,5 - triazine, 6 - methyl - 2,4 - diamino - 1,3,5 - triazine, 2,4,6 - trihydrazine - 1,3,5-triazine, 2,4,6 - triethyl - triamino - 1,3,5 - triazine, and 2,4,6-triphenyl triamino-1,3,5-triazine.

References Cited

UNITED STATES PATENTS

| | | | |
|---|---|---|---|
| 2,458,484 | 1/1949 | Terry | 260—348 |
| 2,485,160 | 10/1949 | Niederhauser | 260—348 |
| 2,567,930 | 9/1951 | Findley | 260—348.5 |
| 2,569,502 | 10/1951 | Sworn | 260—348 |

MURRAY TILLMAN, Primary Examiner

P. LIEBERMAN, Assistant Examiner

U.S. Cl. X.R.

117—124, 132, 134, 135.1, 133, 148, 161; 260—2, 18, 22, 824, 829, 830, 831, 834, 75, 835, 836, 828, 837

PO-1050
(5/69)

UNITED STATES PATENT OFFICE
CERTIFICATE OF CORRECTION

Patent No. 3,493,631      Dated February 3, 1970

Inventor(s) Roger M. Christenson and Rostyslaw Dowbenko

It is certified that error appears in the above-identified patent and that said Letters Patent are hereby corrected as shown below:

Claim 4, column 11, line 1

"alkyl" should read ---alkyd---

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents